(12) United States Patent  (10) Patent No.: US 7,460,110 B2
Ung et al.  (45) Date of Patent: Dec. 2, 2008

(54) DUAL MODE TOUCH SYSTEM

(75) Inventors: Chi-Man Charles Ung, Calgary (CA); David Kenneth Boone, Tigard, OR (US); Roberto A. L. Sirotich, Calgary (CA)

(73) Assignee: Smart Technologies ULC (CA)

( * ) Notice: Subject to any disclaimer, the term of this patent is extended or adjusted under 35 U.S.C. 154(b) by 560 days.

(21) Appl. No.: 10/834,190

(22) Filed: Apr. 29, 2004

(65) Prior Publication Data

US 2005/0243070 A1    Nov. 3, 2005

(51) Int. Cl.
*G06F 3/041* (2006.01)
*G06F 3/042* (2006.01)

(52) U.S. Cl. ............. 345/173; 345/175; 345/176; 345/179; 178/18.03; 178/18.09; 178/18.11; 178/19.01; 178/19.05

(58) Field of Classification Search ............. 345/173, 345/175, 176, 179; 178/18.03, 18.099, 18.11, 178/19.01, 19.05, 18.09
See application file for complete search history.

(56) References Cited

U.S. PATENT DOCUMENTS

| 4,144,449 | A |   | 3/1979  | Funk et al. |
| 4,247,767 | A |   | 1/1981  | O'Brien et al. |
| 4,507,557 | A |   | 3/1985  | Tsikos |
| 4,558,313 | A |   | 12/1985 | Garwin |
| 4,737,631 | A |   | 4/1988  | Sasaki |
| 4,742,221 | A |   | 5/1988  | Sasaki et al. |
| 4,746,770 | A |   | 5/1988  | McAvinney |
| 4,782,328 | A |   | 11/1988 | Denlinger |
| 4,818,826 | A |   | 4/1989  | Kimura |
| 4,822,145 | A | * | 4/1989  | Staelin ................ 349/63 |
| 5,097,516 | A |   | 3/1992  | Amir |
| 5,109,435 | A |   | 4/1992  | Lo et al. |
| 5,317,140 | A |   | 5/1994  | Dunthorn |
| 5,359,155 | A | * | 10/1994 | Helser ................ 178/18.11 |
| 5,448,263 | A |   | 9/1995  | Martin |
| 5,483,261 | A |   | 1/1996  | Yasutake |
| 5,483,603 | A |   | 1/1996  | Luke et al. |
| 5,484,966 | A | * | 1/1996  | Segen ................ 178/18.09 |
| 5,502,568 | A |   | 3/1996  | Ogawa et al. |

(Continued)

FOREIGN PATENT DOCUMENTS

CA     2493236 A1    12/2003

(Continued)

OTHER PUBLICATIONS

Bud K. Funk, CCDs in optical panels deliver high resolution, Electronic Design, Sep. 27, 1980, pp. 139-143.

(Continued)

*Primary Examiner*—My-Chau T Tran
(74) *Attorney, Agent, or Firm*—Katten Muchin Rosenman LLP

(57) ABSTRACT

An apparatus for detecting a pointer includes a waveguide and a touch surface over the waveguide on which pointer contacts are to be made. At least one reflecting device extends along a first side of the waveguide and touch surface. The reflecting device defines an optical path between the interior of the waveguide and the region of interest above the touch surface. At least one imaging device looks across the touch surface and into the waveguide. The imaging device captures images of the region of interest and within the waveguide including reflections from the reflecting device.

34 Claims, 14 Drawing Sheets

U.S. PATENT DOCUMENTS

| | | | |
|---|---|---|---|
| 5,528,263 A | 6/1996 | Platzker et al. | |
| 5,554,828 A * | 9/1996 | Primm | 178/19.06 |
| 5,581,276 A | 12/1996 | Cipolla et al. | |
| 5,638,092 A | 6/1997 | Eng et al. | |
| 5,729,704 A | 3/1998 | Stone et al. | |
| 5,736,686 A * | 4/1998 | Perret et al. | 345/175 |
| 5,737,740 A | 4/1998 | Henderson et al. | |
| 5,745,116 A | 4/1998 | Pisutha-Arnond | |
| 5,771,039 A | 6/1998 | Ditzik | |
| 5,818,421 A * | 10/1998 | Ogino et al. | 345/157 |
| 5,818,424 A | 10/1998 | Korth | |
| 5,819,201 A | 10/1998 | DeGraaf | |
| 5,825,352 A | 10/1998 | Bisset et al. | |
| 5,831,602 A | 11/1998 | Sato et al. | |
| 5,911,004 A | 6/1999 | Ohuchi et al. | |
| 5,914,709 A * | 6/1999 | Graham et al. | 345/175 |
| 5,936,615 A | 8/1999 | Waters | |
| 5,943,783 A | 8/1999 | Jackson | |
| 5,963,199 A | 10/1999 | Kato et al. | |
| 5,982,352 A | 11/1999 | Pryor | |
| 5,988,645 A | 11/1999 | Downing | |
| 6,002,808 A | 12/1999 | Freeman | |
| 6,008,798 A | 12/1999 | Mato, Jr. et al. | |
| 6,061,177 A | 5/2000 | Fujimoto | |
| 6,100,538 A | 8/2000 | Ogawa | |
| 6,118,433 A | 9/2000 | Jenkin et al. | |
| 6,153,836 A | 11/2000 | Goszyk | |
| 6,161,066 A | 12/2000 | Wright et al. | |
| 6,191,773 B1 | 2/2001 | Maruno et al. | |
| 6,208,330 B1 | 3/2001 | Hasegawa et al. | |
| 6,252,989 B1 | 6/2001 | Geisler et al. | |
| 6,256,033 B1 | 7/2001 | Nguyen | |
| 6,262,718 B1 | 7/2001 | Findlay et al. | |
| 6,310,610 B1 | 10/2001 | Beaton et al. | |
| 6,323,846 B1 | 11/2001 | Westerman | |
| 6,335,724 B1 | 1/2002 | Takekawa et al. | |
| 6,339,748 B1 | 1/2002 | Hiramatsu | |
| 6,353,434 B1 | 3/2002 | Akebi | |
| 6,359,612 B1 | 3/2002 | Peter et al. | |
| 6,414,671 B1 | 7/2002 | Gillespie et al. | |
| 6,421,042 B1 | 7/2002 | Omura et al. | |
| 6,429,856 B1 | 8/2002 | Omura et al. | |
| 6,507,339 B1 | 1/2003 | Tanaka | |
| 6,512,838 B1 | 1/2003 | Rafii et al. | |
| 6,518,600 B1 * | 2/2003 | Shaddock | 257/98 |
| 6,531,999 B1 | 3/2003 | Trajkovic | |
| 6,545,669 B1 | 4/2003 | Kinawi et al. | |
| 6,559,813 B1 | 5/2003 | DeLuca et al. | |
| 6,563,491 B1 | 5/2003 | Omura | |
| 6,594,023 B1 | 7/2003 | Omura et al. | |
| 6,608,619 B2 | 8/2003 | Omura et al. | |
| 6,626,718 B2 | 9/2003 | Hiroki | |
| 6,630,922 B2 | 10/2003 | Fishkin et al. | |
| 6,650,822 B1 * | 11/2003 | Zhou | 385/147 |
| 6,674,424 B1 | 1/2004 | Fujioka | |
| 6,690,363 B2 | 2/2004 | Newton | |
| 6,690,397 B1 | 2/2004 | Daignault, Jr. | |
| 6,710,770 B2 | 3/2004 | Tomasi et al. | |
| 6,774,889 B1 | 8/2004 | Zhang et al. | |
| 6,803,906 B1 | 10/2004 | Morrison et al. | |
| 6,864,882 B2 | 3/2005 | Newton | |
| 6,933,981 B1 | 8/2005 | Kishida et al. | |
| 6,972,401 B2 * | 12/2005 | Akitt et al. | 250/221 |
| 6,972,753 B1 * | 12/2005 | Kimura et al. | 345/175 |
| 7,007,236 B2 | 2/2006 | Dempski et al. | |
| 7,030,861 B1 | 4/2006 | Westerman et al. | |
| 7,202,860 B2 | 4/2007 | Ogawa | |
| 7,274,356 B2 | 9/2007 | Ung et al. | |
| 2001/0019325 A1 | 9/2001 | Takekawa | |
| 2001/0022579 A1 | 9/2001 | Hirabayashi | |
| 2001/0026268 A1 | 10/2001 | Ito | |
| 2001/0033274 A1 | 10/2001 | Ong | |
| 2002/0036617 A1 | 3/2002 | Pryor | |
| 2002/0050979 A1 | 5/2002 | Oberoi et al. | |
| 2002/0163530 A1 | 11/2002 | Takakura et al. | |
| 2003/0001825 A1 | 1/2003 | Omura et al. | |
| 2003/0025951 A1 | 2/2003 | Pollard et al. | |
| 2003/0043116 A1 | 3/2003 | Morrison et al. | |
| 2003/0063073 A1 | 4/2003 | Geaghan et al. | |
| 2003/0071858 A1 | 4/2003 | Morohoshi | |
| 2003/0085871 A1 | 5/2003 | Ogawa | |
| 2003/0095112 A1 | 5/2003 | Kawano et al. | |
| 2003/0151532 A1 | 8/2003 | Chen et al. | |
| 2004/0021633 A1 | 2/2004 | Rajkowski | |
| 2004/0046749 A1 | 3/2004 | Ikeda | |
| 2004/0149892 A1 | 8/2004 | Akitt et al. | |
| 2004/0178993 A1 | 9/2004 | Morrison et al. | |
| 2004/0178997 A1 | 9/2004 | Gillespie et al. | |
| 2004/0179001 A1 | 9/2004 | Morrison et al. | |
| 2004/0189720 A1 | 9/2004 | Wilson et al. | |
| 2005/0052427 A1 | 3/2005 | Wu et al. | |
| 2005/0057524 A1 | 3/2005 | Hill et al. | |
| 2005/0151733 A1 | 7/2005 | Sander et al. | |
| 2005/0190162 A1 | 9/2005 | Newton | |
| 2005/0248540 A1 | 11/2005 | Newton | |
| 2006/0202953 A1 | 9/2006 | Pryor et al. | |
| 2006/0274067 A1 | 12/2006 | Hidai | |
| 2007/0075982 A1 | 4/2007 | Morrison et al. | |
| 2007/0126755 A1 | 6/2007 | Zhang et al. | |
| 2007/0236454 A1 | 10/2007 | Ung et al. | |

FOREIGN PATENT DOCUMENTS

| | | |
|---|---|---|
| DE | 198 10452 A1 | 12/1998 |
| EP | 0279652 A | 8/1988 |
| EP | 0347725 A2 | 12/1989 |
| EP | 0762319 A2 | 3/1997 |
| EP | 0829798 A2 | 3/1998 |
| JP | 57-211637 A | 12/1982 |
| JP | 8-240407 A | 9/1996 |
| JP | 9-091094 A | 4/1997 |
| JP | 9-319501 A | 12/1997 |
| JP | 10-105324 A | 4/1998 |
| JP | 2003-167669 A | 6/2003 |
| JP | 2003-173237 A | 6/2003 |
| JP | 2001-282456 A1 | 11/2007 |
| WO | 99/21122 A1 | 4/1999 |
| WO | 99/40562 A1 | 8/1999 |
| WO | 02/03316 A1 | 1/2002 |
| WO | 02/27461 A1 | 4/2002 |
| WO | 03/105074 A2 | 12/2003 |

OTHER PUBLICATIONS

International Search Report with a date of mailing of Oct. 22, 2001 for PCTICA 01100980 with an International Filing Date of Jul. 5, 2001.

Partial European Search Report for EP 03 25 7166 which was completed on May 19, 2006.

European Search Report for EP 06 01 9269 for a search that was completed on Nov. 9, 2006.

European Search Report for EP 06 01 9268 for a search that was completed on Nov. 9, 2006.

European Search Report for EP 02 25 3594 for a search that was completed on Dec. 14, 2005.

European Search Report for EP 04 25 1392 for a search that was completed on Jan. 11, 2007.

Wang, Fie-Yue, "Stereo camera calibration without absolute world coordinate information", SPIE, vol. 2620, pp. 655-662, Jun. 14, 1995.

Bernhard P. Wrobel, "Minimum Solutions for Orientation", Calibration and Orientation of Cameras in Computer Vision, Springer Series in Information Sciences, vol. 34, 2001, pp. 28-33.

Kenichi Kanatani, "Camera Calibration", Geometric Computation for Machine Vision, Oxford Engineering Science Series, vol. 37, 1993, pp. 56-63.

Richard Hartley and Andrew Zisserman, "Multiple View Geometry in Computer Vision", Cambridge University Press, First published 2000, Reprinted (with corrections) 2001, pp. 70-73, 92-93, and 98-99.

Wolfgang Förstner, "On Estimating Rotations", Festschrift für Prof. Dr.-Ing. Heinrich Ebner zum 60. Geburtstag, Herausg.: C. Heipke und H Mayer, Lehrstuhl für Photogrammetrie und Fernerkundung, Tu München, 1999, 12 pages. (http://www.ipb.uni-bonn.de/papers/#1999).

* cited by examiner

– – – above touch surface
· · · · · · · · through waveguide

DUAL MODE TOUCH SYSTEM

FIELD OF THE INVENTION

The present invention relates generally to user input systems and in particular to an apparatus for detecting a pointer within a region of interest.

BACKGROUND OF THE INVENTION

Touch systems are well known in the art and typically include a panel having a touch surface on which contacts are made using a pointer in order to generate user input. Pointer contacts with the touch surface are detected and are used to generate corresponding output depending on areas of the touch surface where the contacts are made. There are basically two general types of touch systems available and they can be broadly classified as "active" touch systems and "passive" touch systems.

Active touch systems allow a user to generate user input by contacting the touch surface with a special pointer that usually requires some form of on-board power source, typically batteries. The special pointer emits signals such as infrared light, visible light, ultrasonic frequencies, electromagnetic frequencies, etc. that activate the touch system.

Passive touch systems allow a user to generate user input by contacting the touch surface with a passive pointer and do not require the use of a special pointer in order to activate the touch system. A passive pointer can be a finger, a cylinder of some material, or any suitable object that can be used to contact the touch surface.

Passive touch systems provide advantages over active touch systems in that any suitable pointing device, including a user's finger, can be used as a pointer to contact the touch surface. As a result, user input can easily be generated. Also, since special active pointers are not necessary in passive touch systems, battery power levels and/or pointer damage, theft, or misplacement are of no or little concern to users.

International PCT Application No. PCT/CA01/00980 filed on Jul. 5, 2001 and published under No. WO 02/03316 on Jan. 10, 2002, assigned to SMART Technologies Inc., assignee of the present invention, discloses a camera-based touch system comprising a touch screen that includes a passive touch surface on which a computer-generated image is presented. A rectangular bezel or frame surrounds the touch surface and supports digital cameras at its corners. The digital cameras have overlapping fields of view that encompass and look across the touch surface. The digital cameras acquire images looking across the touch surface from different locations and generate image data. Images acquired by the cameras are processed by digital signal processors to determine if a pointer exists in the captured images. When it is determined that a pointer exists in the captured images, the digital signal processors convey pointer characteristic data to a master controller, which in turn processes the pointer characteristic data to determine the location of the pointer relative to the touch surface using triangulation. The pointer location data is conveyed to a computer executing one or more application programs. The computer uses the pointer location data to update the computer-generated image that is presented on the touch surface. Pointer contacts on the touch surface can therefore be recorded as writing or drawing or used to control execution of software application programs executed by the computer.

Although the above touch system works extremely well, the use of four digital cameras and associated digital signal processors to capture and process images makes the touch system hardware-intensive and therefore, increases the costs of manufacture. This of course translates into higher costs to consumers. In some environments where expense is a primary concern, less expensive touch systems are desired.

Camera-based touch systems having reduced hardware have been considered. For example, U.S. Pat. No. 5,484,966 to Segen discloses an apparatus for determining the location of an object in an active area of a first plane. The apparatus includes a pair of mirrors extending along different sides of the active area and oriented so that their planes are substantially perpendicular to the plane of the active area. The mirrors form a 90° angle with respect to one another and intersect at a corner of the active area that is diagonally opposite a detecting device. The detecting device includes a mirror and a CCD sensor and looks across the plane of the active area. A processor communicates with the detecting device and receives image data from the CCD sensor.

When a stylus is placed in the active area, the detecting device sees the stylus directly as well as images of the stylus reflected by the mirrors. Thus, images captured by the detecting device include the stylus and one or more stylus reflections. The captured images are processed by the processor to detect the stylus and stylus reflections in the captured images and to calculate the location of the stylus in the active area using triangulation.

Although the Segan apparatus reduces hardware requirements since only one detecting device and processor are used, problems exist in that the line of sight of the detecting device to some areas of the active area may be impeded by a user's hand and/or forearm if the user rests their hand and/or forearm in the active area during writing. This problem is further exaggerated in the case of some left-handed users who tend to curl their arms to the left of and over the area in which they are writing and rest their forearms and hands in the active area.

The above writing scenario is illustrated in FIG. 1 which shows an apparatus 10 similar to that disclosed by Segan. The apparatus 10 includes a touch surface 12 and an imaging device 14 positioned at one corner of the touch surface. The imaging device 14 looks across the touch surface 12. Mirrors 16 and 18 border two sides of the touch surface 12 and intersect at the corner of the touch surface diagonally opposite the imaging device. A pointer P held by a user is in contact with the touch surface 12 during writing. In this writing scenario, during pointer contact on the touch surface, the user's forearm F and hand H are also in contact with the touch surface 12. As will be appreciated, if the user contacts the touch surface 12 using a pointer P in this manner, problems in detecting the location of pointer contact on the touch surface 12 arise. This is due to the fact that the line of sight of the imaging device 14 directly to the pointer P and the line of sight of the imaging device to two of the three pointer images appearing in the mirrors 16 and 18 are blocked by the user's forearm F and hand H. As a result, the imaging device 14 is unable to acquire sufficient pointer data to enable the location of pointer contact on the touch surface 12 to be calculated via triangulation. As will be appreciated, improvements in touch systems of this nature are desired.

It is therefore an object of the present invention to provide a novel apparatus for detecting a pointer within a region of interest.

SUMMARY OF THE INVENTION

Accordingly, in one aspect of the present invention there is provided an apparatus for detecting a pointer comprising a waveguide and a touch surface over the waveguide on which pointer contacts are to be made. At least one reflecting device extends along a first side of the waveguide and the touch surface. The reflecting device defines an optical path between the interior of the waveguide and a region of interest above the touch surface. At least one imaging device looks across the touch surface and into the waveguide. The at least one imaging device captures images of the region of interest and within the waveguide including reflections from the reflecting device.

In one embodiment, the apparatus includes first reflective surfaces extending along a second side of the waveguide and the touch surface. The second side joins the first side at a first corner. The first reflective surfaces face the interior of the waveguide and the region of interest. The imaging device captures images of the region of interest and within the waveguide including reflections from the reflecting device and the first reflective surfaces. A processing device processes images captured by the imaging device to determine the location of the pointer relative to the touch surface.

In one embodiment, the imaging device looks into the waveguide and into the region of interest from a second corner diagonally opposite the first corner. The apparatus may further comprise a pair of light sources, each providing backlight illumination for the imaging device. One of the light sources extends along a side of the waveguide from the second corner to the reflecting device and another of the light sources extends from the second corner to the first reflective surface. The illumination sources provide backlight illumination when a passive pointer is used to contact the touch surface and are conditioned to an off state when an active pointer is used to contact the touch surface.

In another embodiment, second reflective surfaces extend along a third side of the waveguide. The third side joins the first side at a second corner. The second reflective surfaces face the interior of the waveguide and the region of interest. The imaging device captures images of the region of interest and within the waveguide including reflections from the reflecting device and the first and second reflective surfaces. The imaging device looks into the waveguide and the region of interest from a fourth side of the waveguide, the fourth side being opposite the first side.

The imaging device may look through a lens into the waveguide. The lens is constituted by a shaped portion of the waveguide. The shaped portion is a smoothly curved cutout provided in the waveguide having a highly polished surface.

In another aspect of the present invention, there is provided an apparatus for detecting a pointer comprising a touch panel assembly including a touch surface, said touch panel assembly being operable in passive and active modes, in said passive mode, said touch panel assembly detecting passive pointer contacts on said touch surface and in said active mode, said touch panel assembly detecting active pointer contacts on said touch surface.

The touch panel assembly is conditioned to one of the modes in response to generated output signals. The touch panel assembly remains in the passive mode in the absence of the generated output signals. In one embodiment, the active pointer generates the output signals when in contact with the touch surface. In another embodiment, the output signals are generated upon removal of the active pointer from a receptacle of the touch panel assembly. In yet a further embodiment, the active pointer carries a visual identifier and the output signals are generated when captured images include the active pointer.

In yet another aspect of the present invention, there is provided an apparatus for detecting a pointer comprising a waveguide defining a touch surface and being formed of material that produces a region of illumination therein in response to a beam of radiation directed into the waveguide via the touch surface using a pointer. A first reflective surface extends along a first side of the waveguide. At least one imaging device looks into the waveguide and captures images including the region of illumination and reflections thereof as a result of the first reflective surface.

In one embodiment, the apparatus includes a processing device to process images captured by the imaging device to determine the location of the pointer relative to the touch surface. The waveguide fluoresces in response to the beam of radiation thereby to generate the region of illumination. The beam of radiation is in the ultraviolet range.

In still yet another aspect of the present invention, there is provided a tablet for a touch system comprising a waveguide defining a touch surface and being formed of material that fluoresces to produce a region of illumination therein in response to a beam of radiation directed into the waveguide via the input surface. A first reflective surface extends along a first side of the waveguide. At least one lens is provided through which an imaging device looks into the waveguide.

In still yet another aspect of the present invention, there is provided an apparatus for detecting a pointer comprising a waveguide and a touch surface over the waveguide on which pointer contacts are to be made. At least one reflecting device extends along a first side of the waveguide and the touch surface. The reflecting device defines an optical path between the interior of the waveguide and a region of interest above the touch surface. At least one imaging device looks into the waveguide. The at least one imaging device captures images within the waveguide including reflections from the reflecting device.

The present invention provides advantages in that the imaging device is able to see pointer contacts on the touch surface even in situations where the user rests his forearm and/or hand on the touch surface during writing at locations where the forearm and/or hand block the imaging device's direct line of sight to the pointer. This provides a robust, high resolution touch system.

BRIEF DESCRIPTION OF THE DRAWINGS

Embodiments of the present invention will now be described more fully, by way of example only, with reference to the accompanying drawings in which.

DETAILED DESCRIPTION OF THE INVENTION

Figure 1:
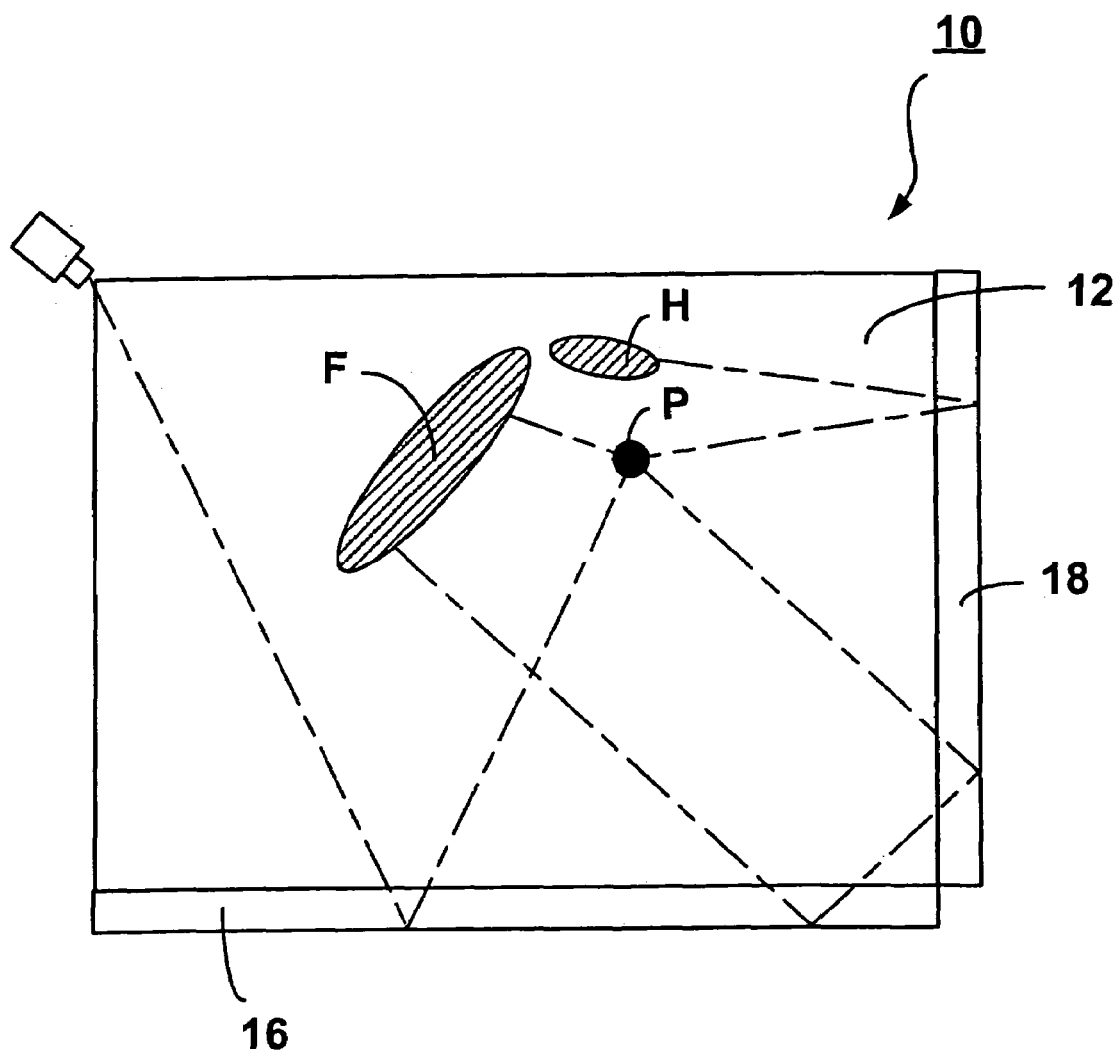
FIG. 1 is a schematic representation of a prior art apparatus for determining the location of an object in an active area.
Figure 2:
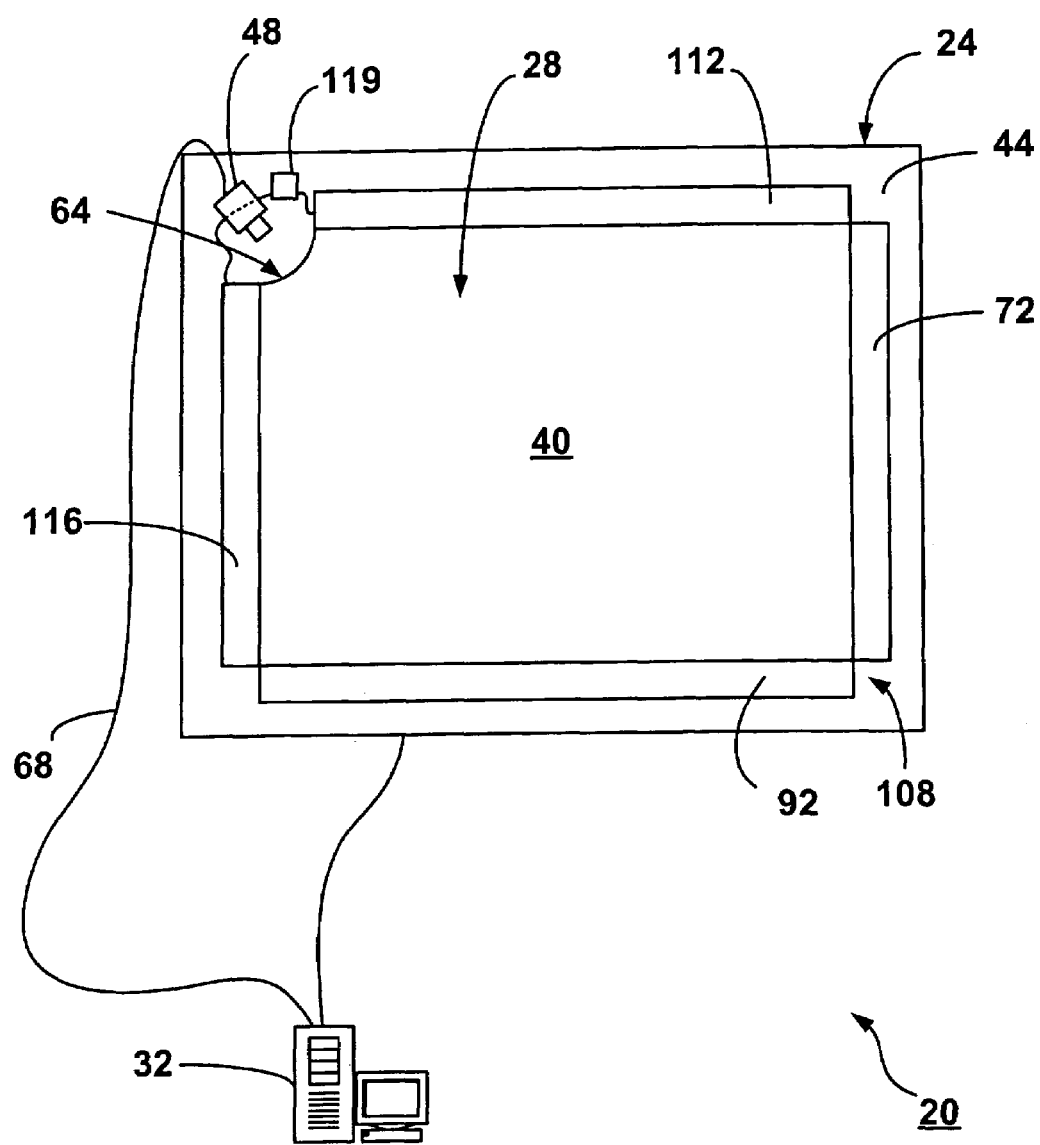
FIG. 2 is a schematic representation of one embodiment of an apparatus for detecting a pointer within a region of interest in accordance with the present invention.

Turning now to FIG. 2, an apparatus for detecting a pointer within a region of interest is shown and is generally identified by reference numeral 20. In this particular embodiment, apparatus 20 is in the form of a touch system. The touch system 20 includes a generally rectangular touch panel assembly 24 encompassing the region of interest. Touch panel assembly 24 includes a generally transparent touch panel 28 that overlies the display screen of a display unit such as for example, a flat-panel monitor or the like (not shown) and an imaging device 48 that is positioned adjacent one corner of the touch panel 28. The imaging device 48 looks both across and through the touch panel 28 and acquires images within its field of view. The acquired images are processed by the imaging device 48 to determine whether a pointer exists in the captured images and if so, to determine the location of the pointer relative to the touch panel 28. Pointer location data generated by the imaging device 48 is conveyed to a computer 32 executing one or more application programs. The computer 32 uses the pointer location data generated by the touch panel assembly 24 to update computer-generated images that are presented on the display screen. Pointer contacts on the touch panel 28 can therefore be recorded as writing or drawing or used to control execution of application programs executed by the computer 32.

Touch panel 28 in this embodiment is a waveguide constructed of transparent plastic so that the display screen is visible through it. The upper surface of the waveguide 28 defines a touch surface 40 on which pointer contacts are to be made. A protective film or coating can be applied to the touch surface 40 to protect the waveguide from scratching and/or marking. A smoothly curved cutout 64 is provided in the waveguide 28 at the corner thereof adjacent the imaging device 48. The curved surface of the cutout 64 is diamond polished. The imaging device 48 is positioned generally at the center of the circle described by the curved cutout 64. Since the radius of the curved cutout 64 is equal to the distance between the pupil of the imaging device 48 and the curved surface of the cutout, light exiting the waveguide 28 through the curved surface of the cutout 64 towards the imaging device 48 does not undergo refraction as a result of the plastic to air transition, thereby reducing distortion.

Figure 3:
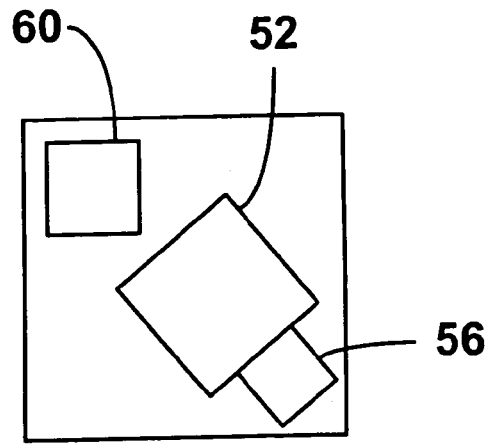
FIG. 3 is a schematic representation of an imaging device forming part of the apparatus of FIG. 2.

Imaging device 48 is best illustrated in FIG. 3 and includes a high resolution 1280×1024 CMOS digital camera 52 such as that manufactured by National Semiconductors under model No. LM9638 and an associated lens 56. A digital signal processor (DSP) 60 is coupled to the digital camera 52. The digital camera 52 and DSP 60 are mounted on a common circuit board. The circuit board is positioned with respect to the waveguide 28 so that the digital camera 52 looks out across the plane of the touch surface 40 and into the waveguide 28. The lens 56 has a 90-degree field of view so that the entire region of interest is within the field of view of the digital camera 52. The DSP 60 is coupled to the computer 32 via a universal serial bus (USB) or RS232 serial cable 68. The digital camera 52 in this embodiment is configured to have an active 80×1280 pixel sub-array allowing it to be operated to capture image frames at high frame rates (i.e. in excess of 200 frames per second).

Figure 4:
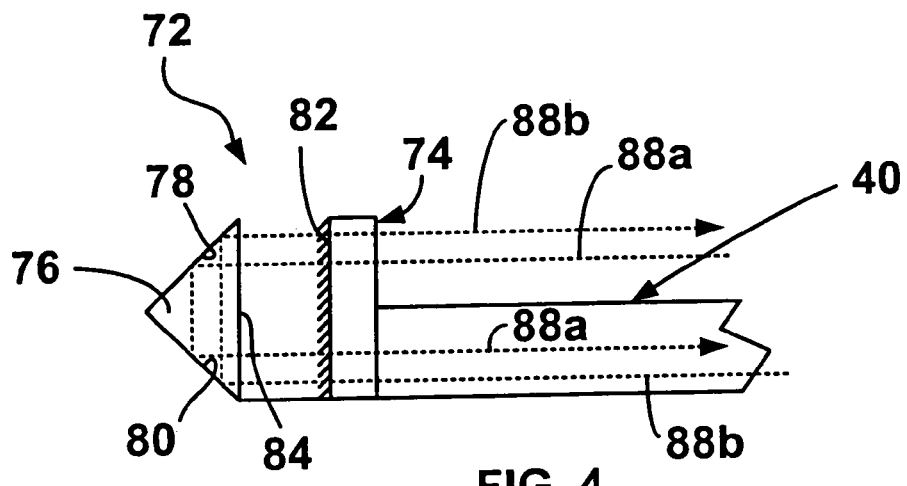
FIG. 4 is a cross-sectional view of a portion of a touch panel forming part of the apparatus of FIG. 2.

The waveguide 28 is bordered by a triangular turning prism assembly 72, a mirror 92 and a pair of illuminated bezels 112 and 116. The turning prism assembly 72 extends along one of the sides of the waveguide 28 that is opposite the imaging device 48. FIG. 4 best illustrates the turning prism assembly 72. As is shown, in this embodiment the turning prism assembly 72 includes a transparent plastic spill guard 74 extending along and abutting the side of the waveguide 28. The spill guard 74 projects above the touch surface 40 by a height equal to about 4 mm. A turning prism 76, commonly referred to as a Porro prism, is positioned behind and slightly spaced from the spill guard 74. The turning prism 76 is similar in height to the spill guard 74 and includes a pair of reflecting surfaces 78 and 80 that intersect at a right angle. The line of intersection of the reflecting surfaces 78 and 80 is in the same plane as the touch surface 40. In this embodiment, turning prism 76 is a length of plastic or glass that has an index of refraction similar to that of the waveguide 28 to reduce optical losses. The surface of the spill guard 74 facing the turning prism 76 includes an anti-reflection coating 82 further to inhibit optical losses. Light entering turning prism 76 at an angle of less than 45 degrees is internally reflected off of the reflecting surfaces 78 and 80 and redirected out of the turning prism 76 along a path parallel to the path of entry. Any directional component of light in the third dimension normal to the cross-sectional view of FIG. 4 is preserved in the light as such light is reflected by face 84 of the turning prism 76.

For example, light 88a travelling above and parallel to the plane of the touch surface 40, upon encountering the turning prism assembly 72, passes through the spill guard 74, enters the turning prism 76, is reflected internally off of the reflecting surfaces 78 and 80 before being redirected out of the turning prism, passes back through the spill guard 74 and enters the waveguide 28. Conversely, light 88b travelling within the waveguide 28 parallel the plane of the touch surface 40 upon encountering the turning prism assembly 72, passes through the spill guard 74, enters the turning prism 76, reflects internally off of the reflecting surfaces 80 and 78 before being redirected out of the turning prism, passes back through the spill guard 74 and travels over the touch surface 40.

Figure 5:
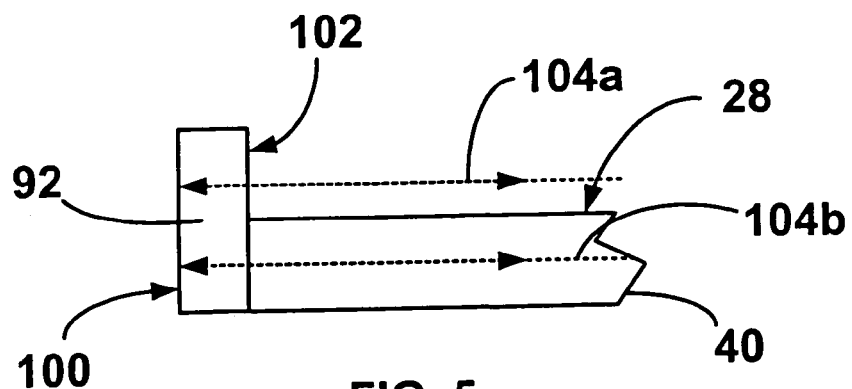
FIG. 5 is a cross-sectional view of another portion of the touch panel.

The mirror 92, best illustrated in FIG. 5, extends along and abuts the other side of the waveguide 28 that is opposite the imaging device 48. Thus, the turning prism assembly 72 and mirror 92 meet at the corner of the waveguide 28 that is diagonally opposite to the imaging device 48. The mirror 92 also projects above the touch surface 40 by a height similar to that of the turning prism assembly 72. Mirror 92 is a length of glass having an internal planar reflective surface 100 that is oriented so that its plane is generally perpendicular to the plane of the touch surface 40.

Light travelling along a path parallel to the plane of the touch surface 40 and impinging on the mirror 92 is reflected off of the reflecting surface 100 along a path remaining in the same plane. Any directional component of light in the third dimension normal to the cross-sectional view of FIG. 5 is preserved in the light as such light is reflected by face 102 of the mirror 92.

For example, light 104a travelling above and parallel to the plane of the touch surface 40, upon encountering the mirror 92, is reflected by the reflective surface 100 back above the touch surface 40 along a path in the same plane. Similarly, light 104b travelling within the waveguide 28 parallel to the plane of the touch surface 40, upon encountering the mirror 92 is reflected back through the waveguide 28 along a path in the same plane.

The infrared illuminated bezels 112 and 116 extend along and abut the remaining two sides of the waveguide 28. The infrared illuminated bezels 112, 116 also project above the touch surface 40 by a height similar to that of the turning prism assembly 72 and mirror 92. The infrared illuminated bezels 112 and 116 project infrared light across the touch surface 40 and through the waveguide 28 towards the reflecting surfaces 78 and 80 of the turning prism 76 and towards the reflective surface 100 of the mirror 92 thereby to provide appropriate bands of infrared backlighting for the imaging device 48. As a result, when the touch system 20 is operating in a passive mode with the illuminated bezels 112 and 116 in an on condition, and a pointer is located within the region of interest, the pointer occludes light and appears to the imaging device 48 as dark objects against a white background. The infrared illuminated bezels 112 and 116 are of the type described in U.S. patent application Ser. No. 10/354,168 entitled "Illuminated Bezel And Touch System Incorporating The Same" to Akitt et al. filed on Jan. 30, 2003 and assigned to SMART Technologies Inc., assignee of the present invention, the content of which is incorporated herein by reference. Accordingly, specifics of the infrared illuminated bezels 112 and 116 will not be described further herein.

A radio frequency receiver 119 is also accommodated by the touch panel assembly 24 and communicates with the illuminated bezels 112 and 116. The radio frequency receiver 119 turns the illuminated bezels off upon receipt of radio signals signifying operation of the touch system 20 in an active mode. When no radio signals are received by the radio frequency receiver 119, the illuminated bezels 112 and 116 remain on signifying operation of the touch system 20 in the passive mode.

Figure 6:
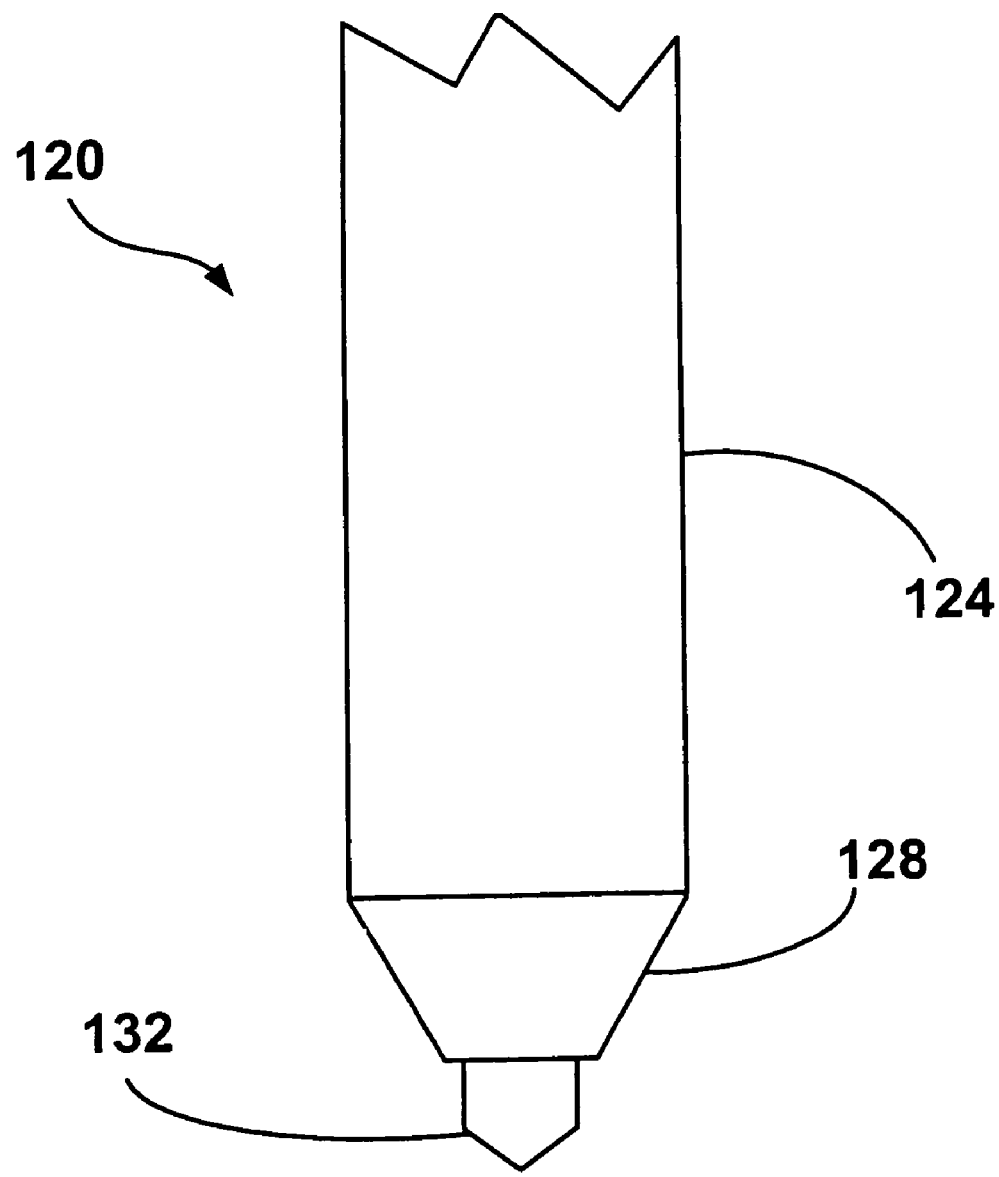
FIG. 6 is a side elevation view of an active pointer for use with the apparatus of FIG. 2.

FIG. 6 shows an active pointer 120 for use with the touch system 20 when the touch system is to be operated in the active mode. The pointer 120 has a main body 124 terminating in a frustoconical tip 128. The tip 128 houses a number of miniature infrared LEDs (not shown). The infrared LEDs are powered by a battery (not shown), also housed in the main body 124. Protruding from the tip 128 is an actuator 132. Actuator 132 is biased out of the tip 128 by a spring (not shown) but can be pushed into the tip 128 upon application of pressure thereto. The actuator 132 is connected to a switch (not shown) within the main body 124 that closes a circuit to power the infrared LEDs when the actuator 132 is pushed against the spring bias into the tip 128. With the LEDs powered, the pointer 120 emits a wide spread beam of infrared light from its tip 128. In addition, when the circuit is closed, a radio frequency transmitter (not shown) within the main body 124 is powered causing the transmitter to emit radio signals. The radio signals are received by the receiver 119 causing the receiver 119 to switch the illuminated bezels 112 and 116 off thereby to condition the touch system 20 to the active mode. When the actuator 132 is biased out of the tip 128, the circuit remains open and, resultingly, neither infrared light nor radio signals are emitted by the pointer 120.

Figure 7:
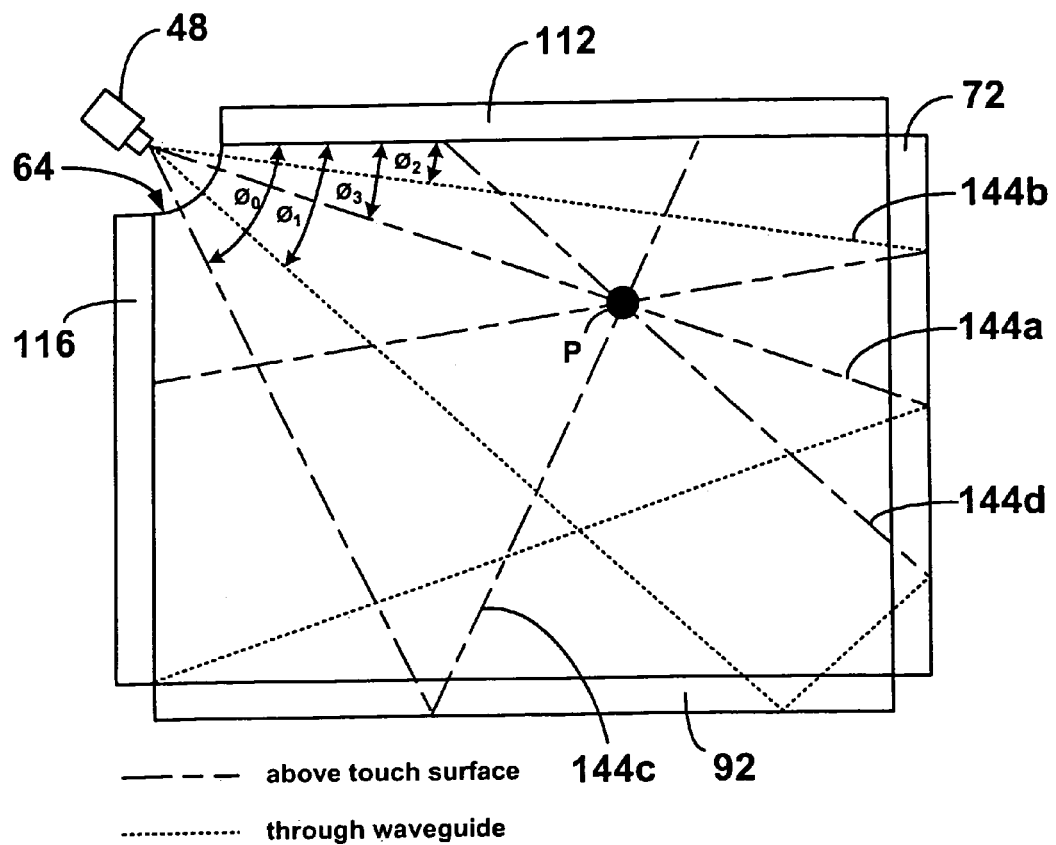
FIG. 7 is a schematic representation of a touch panel assembly showing the lines of sight of the imaging device that intersect a passive pointer.
Figure 8:
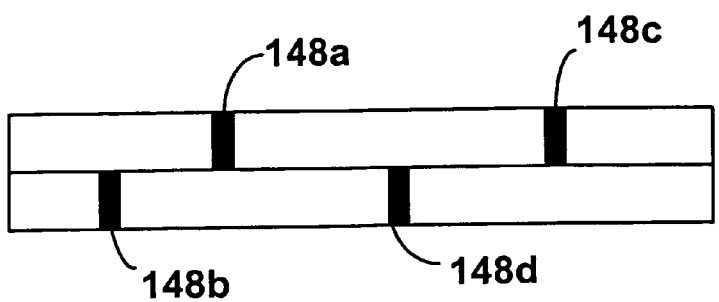
FIG. 8 shows an image captured by the imaging device with the passive pointer in contact with the touch panel.

Turning to FIGS. 7 and 8, the operation of the touch system 20 in the passive mode will firstly be described. As mentioned previously, in the passive mode the illuminated bezels 112 and 116 are conditioned to project infrared backlighting over the touch surface 40 and through the waveguide 28. As a result, the imaging device 48 sees bright bands of illumination within its field of view. When a pointer P is brought into contact with the touch surface 40 and therefore, into the field of view of the imaging device 48, the pointer occludes backlight illumination and therefore appears as dark regions interrupting the bright bands of illumination seen by the imaging device 48. Paths 144a to 144d represent the lines of sight of the imaging device 48 that intersect the pointer P and hence, correspond with the dark regions i.e. those lines of sight where the backlight illumination has been interrupted or occluded by the pointer P.

Path 144a is the line of sight of the imaging device 48 aimed directly at the pointer P over the touch surface 40. Pointer P in this case occludes light emitted by the illuminated bezel 116 that travels through the waveguide 28, is redirected by the turning prism assembly 72 and travels over the touch surface 40. Path 144b is the line of sight of the imaging device 48 looking through the waveguide 28 that sees the left reflection of the pointer P in the turning prism assembly 72. Pointer P in this case occludes light emitted by the illuminated bezel 116 that travels over the touch surface 40 directly at the pointer P. Path 144c is the line of sight of the imaging device 48 looking across the touch surface 40 that sees the right reflection of the pointer P in the mirror 92. Pointer P in this case occludes light emitted by the illuminated bezel 112 that travels over the touch surface 40 directly at the pointer P. Path 144d is the line of sight of the imaging device 48 looking through the waveguide 28 that sees the double reflection of the pointer P in the mirror 92. Pointer P in this case occludes light emitted by the illuminated bezel 112 that travels over the touch surface 40 directly at the pointer P. As will be appreciated, the pointer P occludes infrared backlighting along two lines of sight of imaging device 48 extending across the touch surface 40 and along two lines of sight of the imaging device 48 extending through the waveguide 28. As a result, two dark regions 148a, 148c and 148b, 148d representing the pointer P, appear in each bright band of illumination seen by the imaging device 48 as shown in FIG. 8 allowing the location of the pointer P to be calculated using triangulation.

Figure 9:
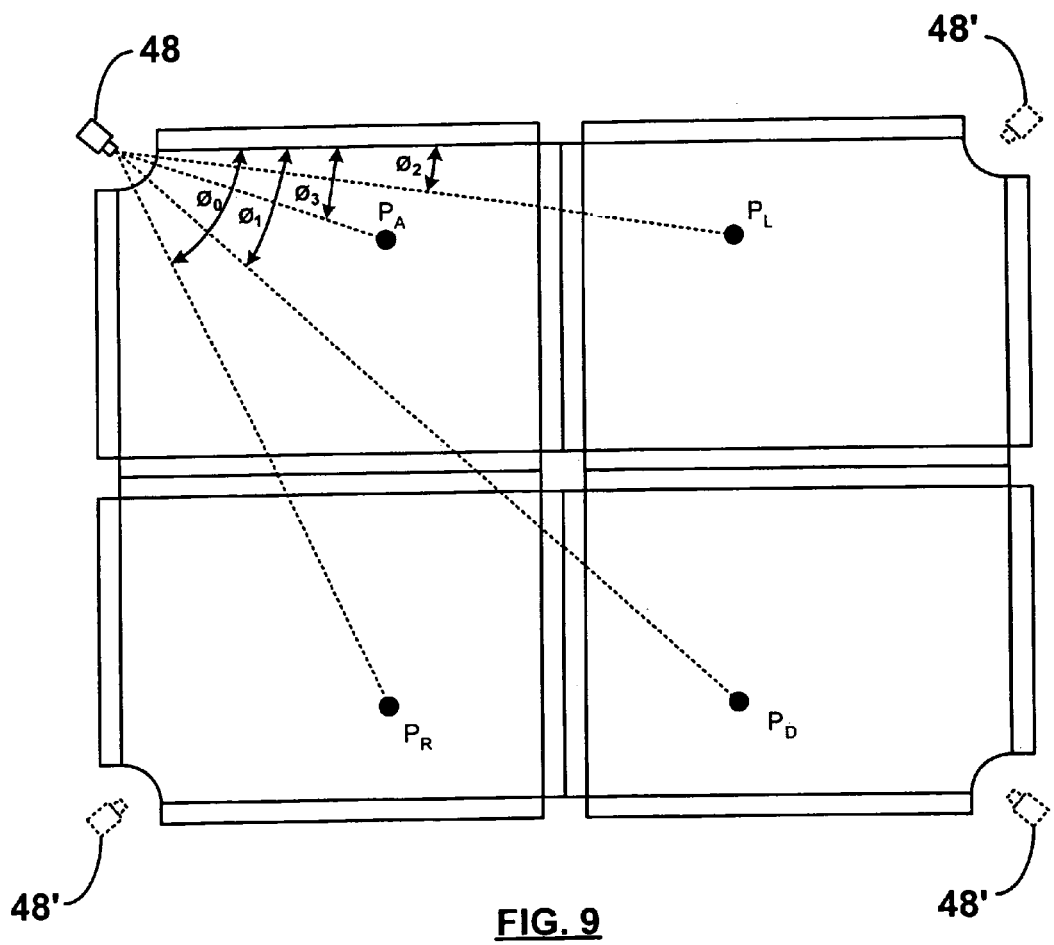
FIG. 9 shows actual and virtual touch panel assemblies.

The use of the mirror 92 and turning prism assembly 72 effectively creates a touch system 20 equivalent to a touch system that is four times as large with virtual imaging devices 48' at each of its corners as shown in FIG. 9. In this case, the pointer reflections can be considered to be seen by the virtual imaging devices 48' with the pointer reflections determining the positions of the virtual angles. Angles are associated with the virtual images and these angles are identical to the angles $\emptyset_0$ to $\emptyset_3$ associated with the pointer and pointer reflections illustrated in FIG. 7.

When an image is captured by the imaging device 48 and the image includes dark regions representing a pointer P, the image is processed by the DSP 60 in a manner similar to that described in U.S. patent application Ser. No. 10/681,330 filed on Oct. 9, 2003 to Ung et al, assigned to SMART Technologies Inc., assignee of the present invention, the content of which is incorporated herein by reference, to determine the location of pointer contact on the touch surface 40. The pointer location data is then conveyed to the computer 32. Those of skill in the art will appreciate that the touch system 20 is calibrated to take refraction caused by the air to plastic and plastic to air transitions into account so that the pointer location data processed by the computer 32 accurately reflects the actual point of contact on the touch surface 40 of the waveguide 28.

Figure 10:
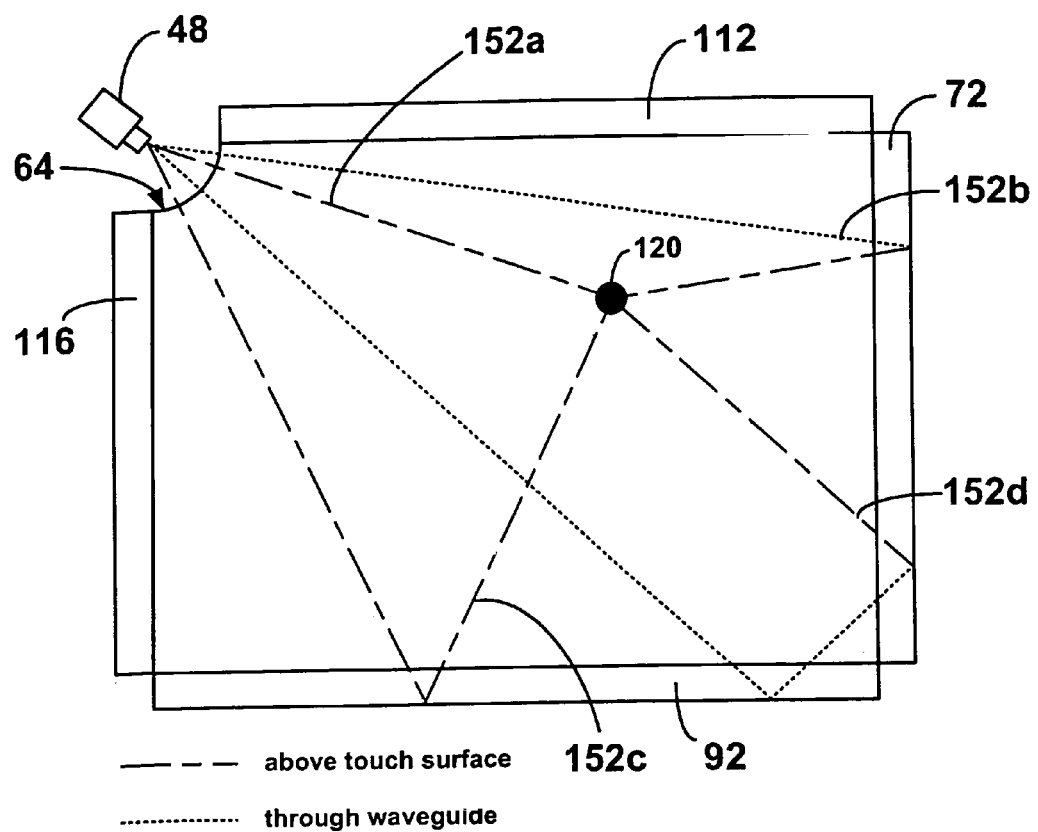
FIG. 10 is a schematic representation of the touch panel assembly showing the lines of sight of the imaging device that intersect an active pointer.
Figure 11:
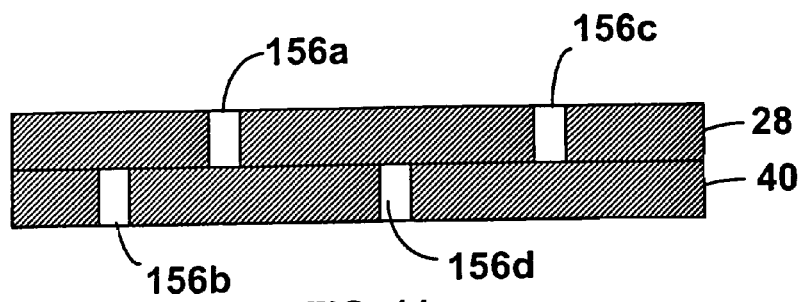
FIG. 11 shows an image captured by the imaging device with the active pointer in contact with the touch panel.

Turning now to FIGS. 10 and 11, the operation of the touch system 20 in the active mode will be described. As mentioned previously, in the active mode, the receiver 119 turns the illuminated bezels 112 and 116 off in response to radio signals emitted by the pointer 120 when the pointer is brought into contact with the touch surface 40 with sufficient force to push the actuator 132 into the tip 128. With the pointer 120 in this state, the LEDs in the tip 128 are powered causing the pointer 120 to emit a wide spread beam of infrared light from its tip.

With the pointer 120 illuminated in this manner, the imaging device 48 receives emitted light travelling over the touch surface 40 directly from the pointer 120 as identified by path 152a. The imaging device 48 also receives emitted light travelling over the touch surface 40 that reflects off of the mirror 92 as identified by path 152c. The imaging device 48 also receives emitted light that travels over the touch surface 40, is redirected by the turning prism assembly 72 and travels through the waveguide 28 as identified by path 152b. The imaging device 48 further receives emitted light that travels over the touch surface 40, is redirected by the turning prism assembly 72 into the waveguide 28, is reflected off of the mirror 92 before continuing through the waveguide 28 as identified by path 152d. In this case, since the illuminated bezels 112 and 116 are off, the pointer 120 appears as light regions 156a to 156d interrupting dark bands. Similar to the passive mode, two light regions representing the pointer 120 appear in each dark band allowing the location of pointer contact on the touch surface 40 to be calculated using triangulation.

Because the imaging device 48 sees the pointer looking both across the touch surface 40 and through the waveguide 28, the imaging device 48 is able to see pointer contacts with the touch surface 40 even in situations where the user rests his forearm and/or hand on the touch surface 40 during writing at locations where the forearm and/or hand block the imaging device's direct line of sight to the pointer.

Figure 12:
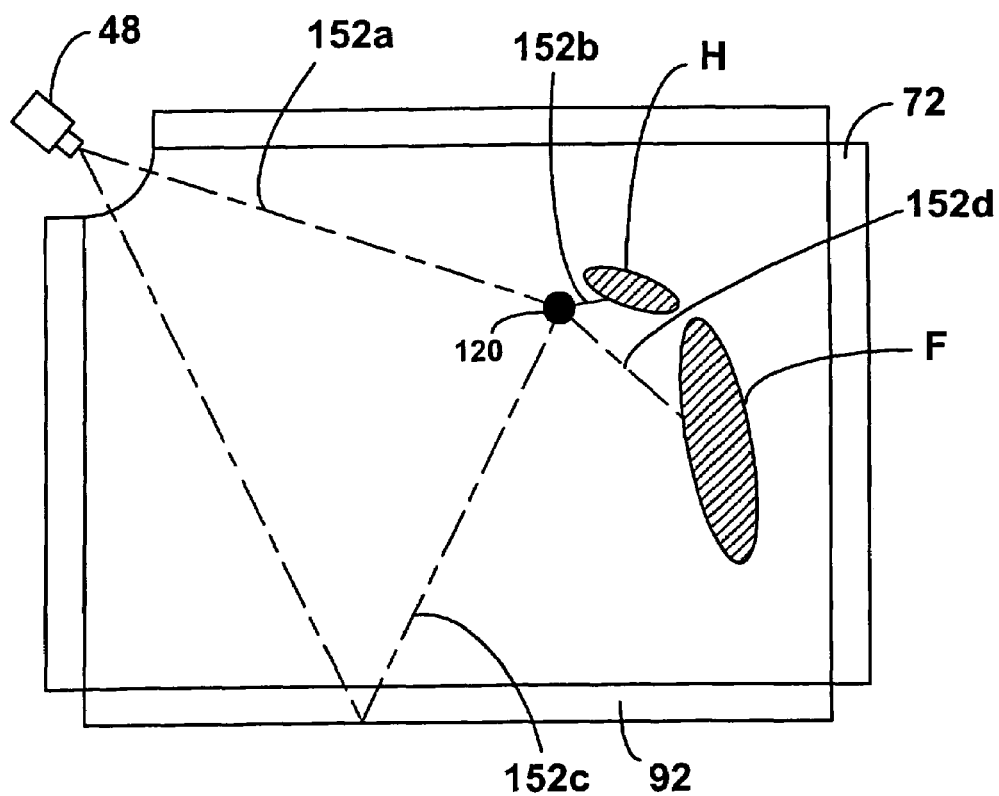
FIGS. 12 and 13 are schematic representations of the touch panel assembly showing different writing scenarios.

For example, FIG. 12 illustrates a writing scenario where a right-handed user rests his forearm F and hand H on the touch surface 40 while writing with the pointer 120. For ease of illustration, the pointer 120 is shown in the same position as in FIG. 10, thus creating the same light paths 152a, 152b, 152c and 152d. In this case, the user's forearm F and hand H obstruct the light emitted by the pointer 120 travelling along paths 152b and 152d. The emitted light travelling along paths 152a and 152c however remains unobstructed allowing the true pointer and right pointer reflection to be captured in an image. As a result, the location of pointer contact on the touch surface 40 can still be calculated using triangulation.

Figure 13:
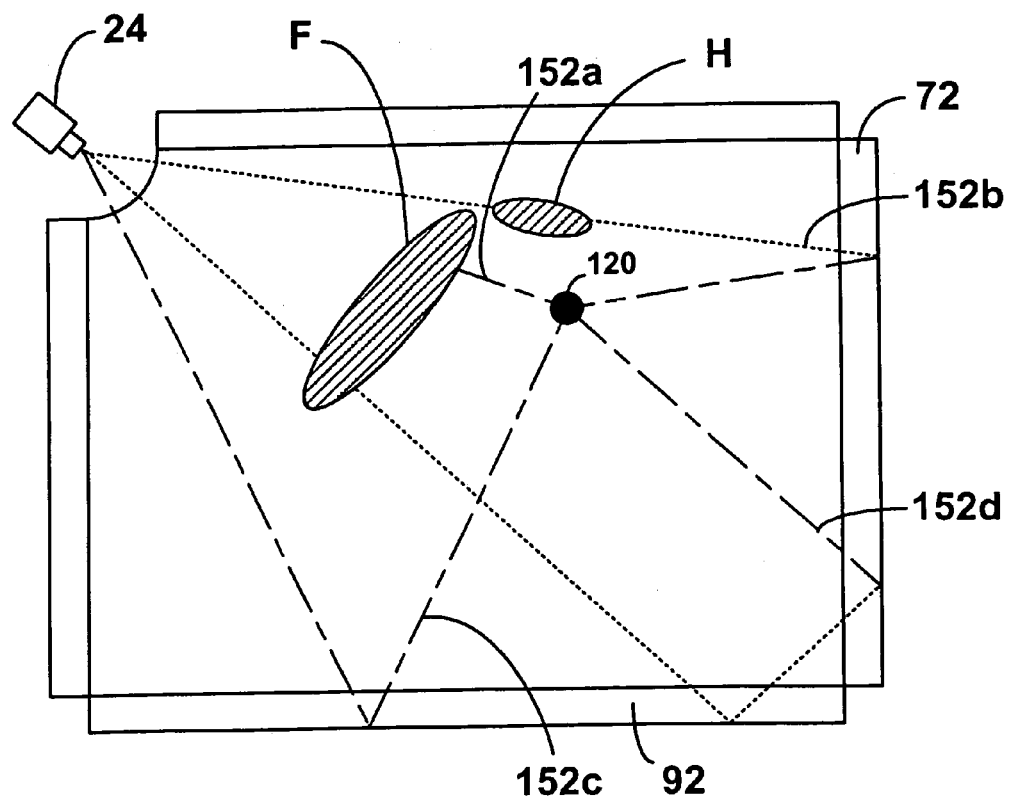

FIG. 13 illustrates a writing scenario where a left-handed user rests his forearm F and hand H on the touch surface 40 while writing with the pointer 120. The pointer 120 is, again, shown in the same position as in FIG. 10, thus creating the same light paths 152a, 152b, 152c and 152d. In this case, the user curls his left forearm F and hand H in an exaggerated manner, sometimes referred to as a "left hook". The user's forearm F and hand H obstruct the light emitted by the pointer 120 travelling only along path 152a. The emitted light travelling along paths 152b and 152d reaches the imaging device 48 through the waveguide 28 and thus, passes beneath the user's forearm F and hand H. As a result, the right, left and double pointer reflections can be captured in an image allowing the location of pointer contact on the touch surface 40 to be calculated using triangulation.

As will be appreciated, the touch system 20 allows the locations of pointer contacts on the touch surface 40 to be determined even though the user's style of writing may block the imaging device's direct line of sight to the pointer. This yields a high-resolution touch system.

Figure 14:
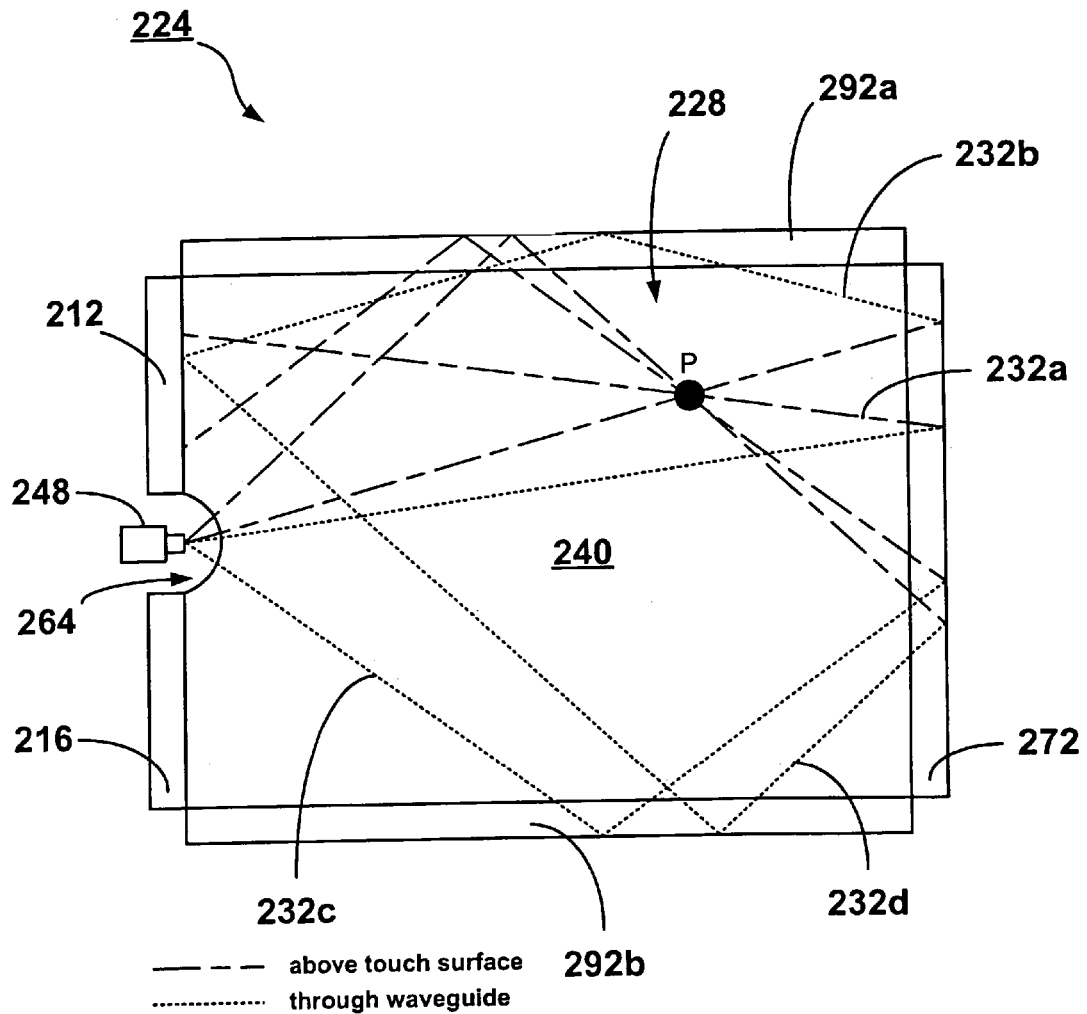
FIGS. 14 to 16 show alternative embodiments of touch panel assemblies.

FIG. 14 shows an alternative embodiment of a touch panel assembly 224. In this embodiment, touch panel assembly 224 includes a generally rectangular waveguide 228 having an upper touch surface 240. A smoothly curved cutout 264 is provided generally centrally along one side of the waveguide 228. An imaging device 248 is positioned adjacent the cutout and looks both across the touch surface 240 and into the waveguide 228. Illuminated bezels 212 and 216 extend along and abut the side of the waveguide flanking the cutout 264. The illuminated bezels 212 and 216 also extend above the touch surface 240. Infrared light sources (not shown) are also strung above and below the imaging device 248. The illuminated bezels 212 and 216 and infrared light sources provide infrared backlighting both across the touch surface 240 and through the waveguide 228. A turning prism assembly 272 similar to that of the previous embodiment extends along the side of the waveguide 228 opposite the imaging device 248. Mirrors 292a and 292b extend along and abut the remaining two sides of the waveguide 228. The mirrors 292a and 292b similarly project above the touch surface 240.

Waveguide 228, illuminated bezels 212 and 216, infrared light sources, imaging device 248, turning prism assembly 272 and mirrors 292a and 292b function in a similar manner to waveguide 40, imaging device 48, turning prism 72, mirror 92, and illuminated bezels 112 and 116 of the first embodiment. Thus, similar to the first embodiment, the touch panel assembly 224 can operate in a passive or active mode. In the passive mode, the illuminated bezels 212 and 216 and infrared light sources are illuminated and project infrared backlighting across the touch surface 240 and through the waveguide 228. The imaging device 248 therefore sees bright bands of illumination when no pointer is within its field of view. When a pointer P is brought into the field of view of the imaging device 248 and contacts the touch surface 240, the pointer P occludes backlighting. The pointer P and reflections of the pointer in the turning prism assembly 272 and mirrors 292a and 292b appear as dark regions against a white background in captured images allowing the locations of pointer contacts on the touch surface 240 to be calculated using triangulation.

In the example of FIG. 14, the pointer P occludes backlighting along four lines of sight 232a to 232d of the imaging device 248 resulting in four dark regions appearing in a captured image. Path 232a is the line of sight of the imaging device 248 looking through the waveguide 228 that sees the reflection of the pointer P in the turning prism assembly 272. Pointer P in this case occludes light emitted by illuminated bezel 212 that travels over the touch surface 240 directly at the pointer. Path 232b is the line of sight of the imaging device 248 looking across the touch surface 240 directly at the pointer P. Pointer P in this case occludes light emitted by the illuminated bezel 212 that travels through the waveguide 228 to mirror 292a, reflects off of mirror 292a and continues through the waveguide 228 to the turning prism assembly 272, and is redirected by the turning prism assembly 272 over the touch surface 240 towards the pointer P. Path 232c is the line of sight of the imaging device 248 looking through the waveguide 228 that sees the double reflection of the pointer in the mirror 292b. Pointer P in this case occludes light emitted by the illuminated bezel 212 that travels over the touch surface 240 and is reflected by mirror 292a at the pointer P. Path 232d is the line of sight of the imaging device 248 looking across the touch surface 240 that sees the reflection of the pointer P in the mirror 292a. Pointer P in this case occludes light emitted by the illuminated bezel 212 that travels through the waveguide 228 to mirror 292b, reflects off of mirror 292b and continues through the waveguide 228 to the turning prism assembly 272 and is redirected by the turning prism assembly 272 over the touch surface 240 toward the pointer P.

In the active mode, the illuminated bezels 212 and 216 and infrared light sources are turned off and the active pointer 120, which emits light upon contact with the touch surface 240, is used. Light emitted by the pointer 120 may travel directly to the imaging device 248 and/or reflect off of the turning prism assembly 272 and mirrors 292a and 292b before travelling to the imaging device either across the touch surface 240 or through the waveguide 228. As a result, the pointer 120 and its reflections appear as bright regions against a dark background in captured images allowing the locations of pointer contacts on the touch surface 240 to be calculated using triangulation.

The touch panel assembly 224 is advantageous in that reduced lengths of infrared illuminated bezels are required, thus decreasing manufacturing costs.

Figure 15:
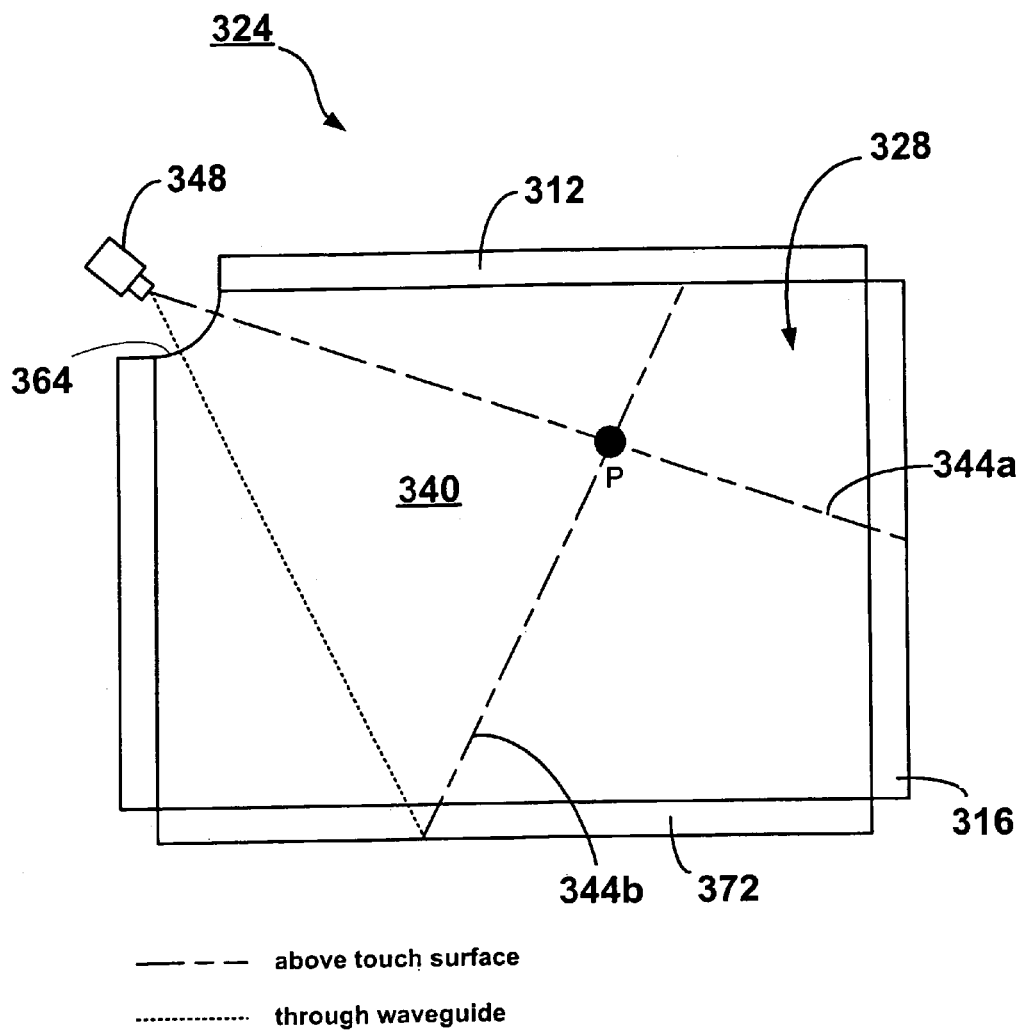

FIG. 15 shows yet another embodiment of a touch panel assembly 324. In this embodiment, touch panel assembly 324 includes a generally rectangular waveguide 328 having an upper touch surface 340. A smoothly curved cutout 364 is provided at one corner of the waveguide 328. An imaging device 348 is positioned adjacent the cutout and looks across the touch surface 340 and through the waveguide 328. Illuminated bezels 312 and 316 arranged at right angles extend along two sides of the waveguide 328. The illuminated bezels 312 and 316 extend above the touch surface 340 and thus, project infrared backlighting both across the touch surface 340 and through the waveguide. A turning prism assembly 372 extends along the side of the waveguide 328 that intersects the illuminated bezel 316 at a corner diagonally opposite the imaging device 348.

In the passive mode, the illuminated bezels 312 and 316 are illuminated and project infrared backlighting both across the touch surface 340 and through the waveguide 328. The imaging device 348 therefore sees bright bands of illumination when no pointer is within its field of view. When a pointer P is brought into the field of view of the imaging device 348 and contacts the touch surface 340, the pointer P occludes backlighting. The pointer P and reflections of the pointer in the turning prism assembly 372 appear as dark regions against a white background in captured images allowing the locations of pointer contacts on the touch surface 340 to be calculated using triangulation.

In the example of FIG. 15, the pointer P occludes backlighting along two lines of sight 344a and 344b resulting in two dark regions appearing in a captured image. Path 344a is the line of sight of the imaging device 348 looking across the touch surface 340 directly at the pointer P. Path 344b is the line of sight of the imaging device 348 looking through the waveguide 328 that sees the reflection of the pointer P in the turning prism assembly 372.

In the active mode, the illuminated bezels 312 and 316 are turned off and the active pointer 120, which emits light upon contact with the touch surface 340, is used. Light emitted by the pointer 120 may travel directly to the imaging device 348 across the touch surface 340 or reflect off of the turning prism assembly 372 before travelling to the imaging device 348 through the waveguide 328. As a result, the pointer 120 and its reflection in the turning prism assembly 372 appear as bright regions against a dark background in captured images allowing the locations of pointer contacts on the touch surface 340 to be calculated using triangulation.

Since the number of reflective surfaces is reduced in this embodiment, manufacturing costs are also reduced.

Rather than switching the illuminated bezels on or off depending on the mode of operation of the touch systems, if desired, uniform illuminated bezels that always remain on and project light having an intensity that does not saturate the imaging device(s) can be used. In this case, in the active mode, an active pointer that projects light having an intensity greater than that of the light projected by the illuminated bezels is used so that the pen and its reflections can be discerned from the background light in captured images. Alternatively, the illuminated bezels and the active pointer can be pulsed at different frequencies allowing the touch systems to operate in dual modes.

Figure 16:
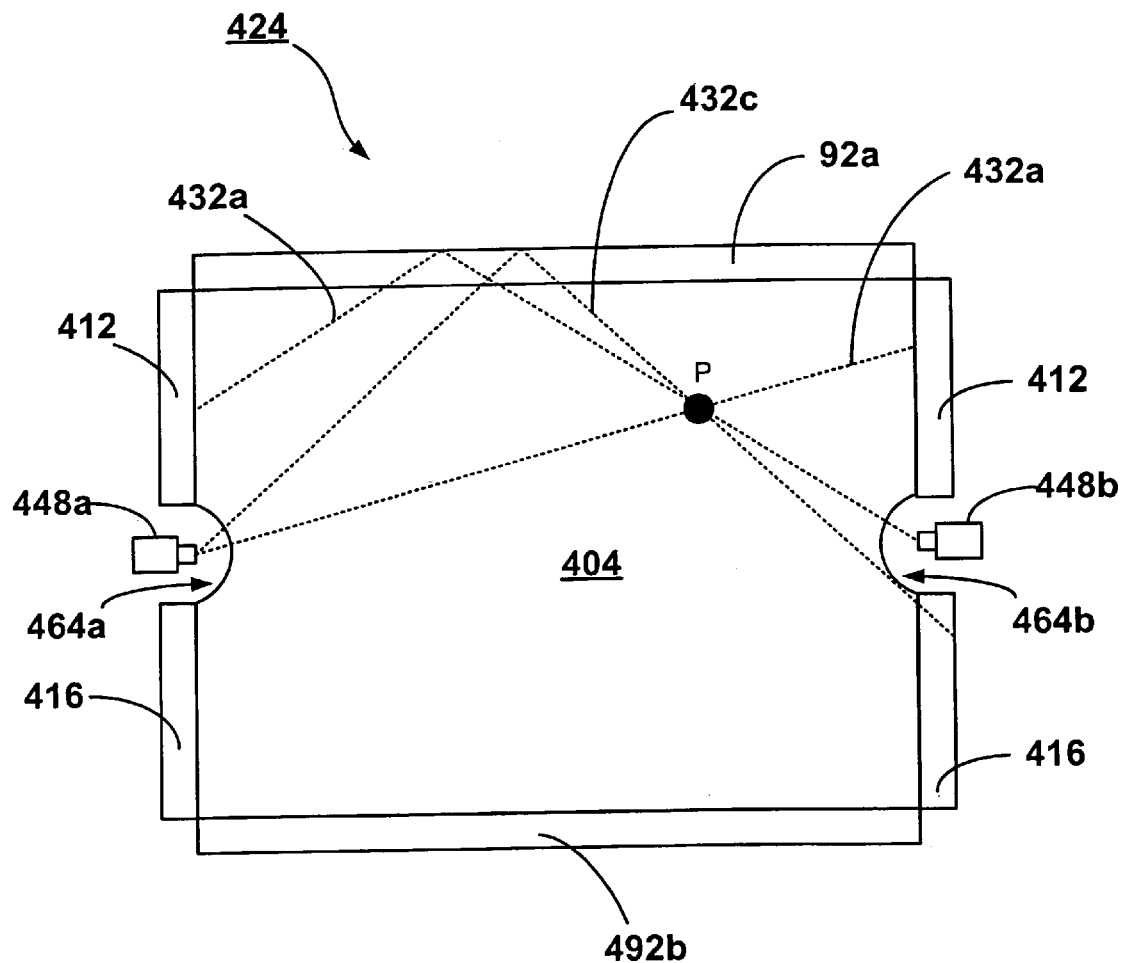
Figure 17:
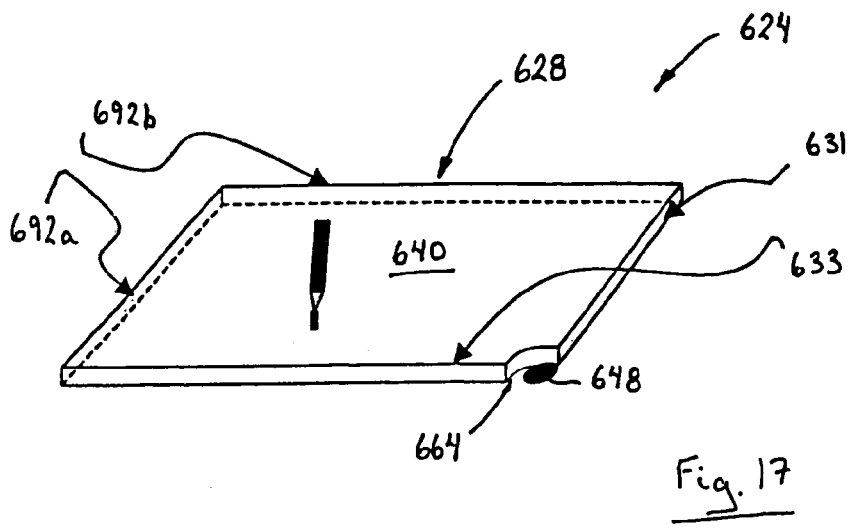
FIG. 17 is a perspective view of yet another embodiment of a touch panel assembly.
Figure 18:
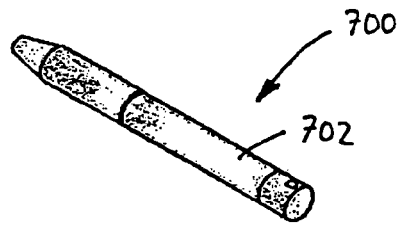
FIG. 18 is a perspective view of an active pen for use with the touch panel assembly of FIG. 17.
Figure 19:
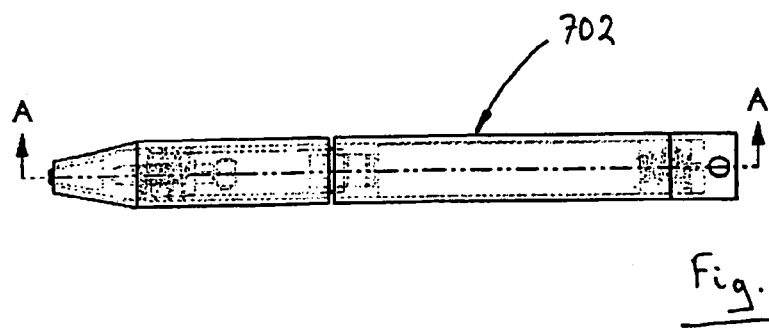
FIGS. 19 and 20 are side and end views of the pen of FIG. 18.
Figure 20:
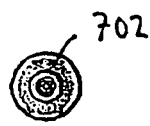
Figure 21:
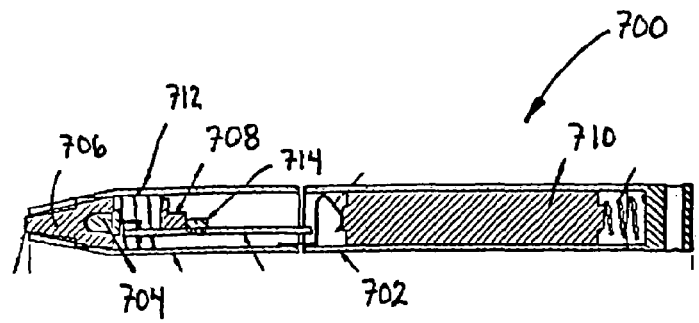
FIG. 21 is a sectional view of the pen taken along line A-A in FIG. 19.

FIG. 16 shows still yet another embodiment of a touch panel assembly 424. The touch panel assembly 424 includes a generally rectangular touch panel 428 with two mirrors 492a and 492b extending along its opposite sides. Cutouts 464a and 464b are centrally provided in opposite sides of the touch panel 428 and accommodate imaging devices 448a and 448b. Illuminated bezels 412 and 416 extend along the sides of the touch panel 428 flanking the cutouts 464a and 464b. Infrared light sources (not shown) are also strung above and below the imaging devices 448a and 448b.

As shown, when a pointer contact is made on the touch surface 440, at least one of the imaging devices sees the pointer and a single pointer reflection allowing the location of the pointer contact to be calculated using triangulation. This fourth embodiment is advantageous as the hardware manufacture costs are significantly reduced.

Turning now to FIGS. 17 to 22, yet another embodiment of a touch panel assembly 624 is shown. As can be seen, touch panel assembly 624 includes a touch panel or tablet 628 that is generally rectangular in top plan. The tablet 628 overlies a display screen or monitor such as for example a liquid crystal display and is generally transparent to visible light so that images presented on the display screen can be seen through the tablet. A smoothly curved cutout 664 is provided in the tablet at one corner. An imaging device 648 is accommodated by the cutout 664 and has a field of view looking into the tablet 628.

The tablet 628 in this embodiment is formed of acrylic material such as that manufactured by GE Plastics under type No. GP FL. The acrylic material is doped with a pigment that fluoresces in response to light in the ultraviolet (UV) range. The side surfaces 631 and 633 of the tablet 628 that extend from and flank the cutout 664 are diffused surfaces. The side surfaces 692a and 692b of the tablet 628 that intersect at a corner diagonally opposite the imaging device 648 are highly polished and reflective thereby to define total internal reflection (TIR) mirrors. The tablet 628 acts as a waveguide so that light travelling therein is totally internally reflected. An anti-reflective coating and a filter coating are provided on the upper surface 640 of the tablet 628. The filter coating acts as a UV bandpass filter to reduce ambient light from entering into the tablet. A protective transparent layer may be provided over the upper surface 640 to inhibit the tablet 628 from being damaged or scratched.

When a source of UV light is used to direct a beam of UV light into the tablet via the upper surface 640, the beam of UV light causes a region within the tablet interior to fluoresce and hence, glow blue in color. The imaging device 648, which looks into the interior of the tablet sees the glowing region directly as well as one or more reflections of the glowing region appearing in the reflective surfaces 692a and 692b. As a result, images captured by the imaging device 648 can be processed to detect the location of the glowing region and hence, the location of the UV light source relative to the surface 640 using triangulation.

Turning now to FIG. 18 to 21, a source of UV light for use with the touch panel assembly 628 is shown. In this embodiment, the source of UV light is in the form of a pen 700 having a casing 702 accommodating a UV light emitting diode (LED) 704, a lens system and waveguide 706, a pulsing circuit 708 and a power source 710, in this case a battery. The casing 702 can be opened to permit access to the battery 710 to allow the battery to be replaced but is completely sealed to inhibit access to the UV LED 704, lens system and waveguide 706 and the pulsing circuit 708. The waveguide is in the form of a light pipe having converging sides and a roughened narrow tip. In this manner, light travelling through the light pipe converges to a small point at the tip prior to being dispersed from the end of the light pipe at a large angle. A tip switch 712 is provided at the distal end of the casing 702 that is activated when the tip of the pen 700 is brought into contact with the upper surface 640. When activated, the tip switch 712 actuates a microswitch 714 causing the pen 700 to illuminate.

In particular, when the microswitch 714 is actuated, the pulsing circuit 708 is powered resulting in the UV LED 704 being energized in a manner to cause the UV LED to generate pulses of UV light at a 10% duty cycle. The pulses of UV light generated by the UV LED 704 are directed to the lens system and waveguide 706. The lens system and waveguide 706 in turn directs the UV light pulses to the tip of pen, focuses the UV light pulses to a pinpoint at the tip prior to dispersing the UV light pulses from the tip of the pen 700 at a large angle.

Figure 22:
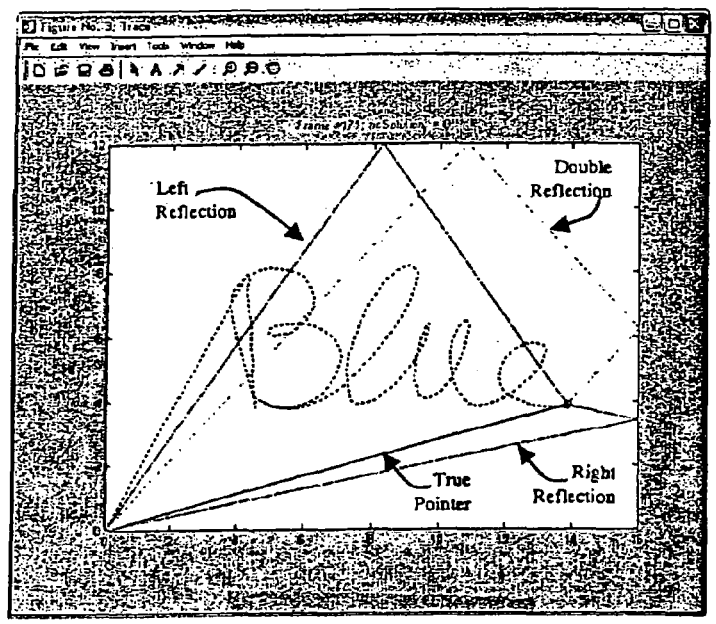
FIG. 22 is a top plan view of the touch panel assembly of FIG. 17.

FIG. 22 shows the pen 700 being used to write on the upper surface 640 of the tablet 628. Movement of the pen 700 over the tablet 628 is tracked and mapped to the coordinate system of the display so that the pen movement is used to update the images presented by the display.

As will be appreciated, since the imaging device 648 looks into the interior of the tablet 628 and not over and across the surface of the tablet, contact between portions of the user's body such as the hand and/or forearm during writing does not impede the ability of the touch panel assembly 624 to track movement of the pen across the tablet.

If desired, a non-reflective region can be provided at the corner of the tablet that is diagonally opposite the imaging device 648 to avoid the imaging device from seeing an image of the glowing region resulting from a double reflection when the pen is brought into close proximity with the corner as described in co-pending U.S. patent application Ser. No. 10/681,330 to Ung et al., assigned to SMART Technologies Inc., assignee of the present invention. The non-reflective region can be in the plane of one or both of the reflective surfaces 692a and 692b.

Although in some embodiments the imaging devices are described as looking both across the touch surface and into the waveguide, separate imaging devices looking either across the touch system or into the waveguide can be employed. Additional imaging devices can also be included in the touch panel assemblies to provide redundancy and thereby increase resolution. In the embodiments employing a waveguide and at least one mirror, each mirror can be replaced with a turning prism assembly.

In the embodiments of FIGS. 1 to 16, if desired, similar to the embodiment of FIGS. 17 to 22, the imaging device can be configured only to look into the waveguide. In this manner, images including pointer reflection that are directed into the waveguide are processed to determine pointer contacts on the touch surface. As will be appreciated by those of skill in the art, in order to ensure that sufficient pointer reflections are directed into the waveguide, mirrors may need to be replaced with turning prism assemblies.

Although the mirrors are described as having generally planar reflective surfaces, other mirror configurations can be used. For example, the mirrors can be made to have a convex vertical profile. The reflective surfaces may also include v-grooves with the v-grooves extending along the length of the mirror. Other suitable mirror configurations will also be apparent to those skilled in the art. For example, rather than using continuous mirrors abutting the sides of the waveguide and extending above the touch surface, the sides of the waveguide can be polished thereby to form TIR mirrors. In this case, only mirrors extending above the touch surface of the waveguide are required. Also, instead of using turning prisms to define an optical path between the interior of the waveguide and the region above the touch surface, air spaced mirrors may also be used.

If desired, the radius of the curved cutout can be altered to expand or reduce the field of view of the imaging device although this may create slight distortion as a result of refraction due to the plastic to air transition.

Rather than emitting radio signals when in contact with the touch surface, the active pointer can be designed to emit other types of signals that can be detected to enable the touch system to be conditioned to the active mode.

In addition, although some of the touch panel assemblies have been described as including a receiver that receives radio signals emitted by the active pointer 120 when the active pointer is brought into contact with the touch surface, those of skill in this art will appreciate that alternative mode switching mechanisms can be implemented. For example, the touch panel assemblies may include a receptacle for the active pointer. In this case, when the active pointer is removed from the receptacle, a sensor associated with the receptacle generates output that is used to signify operation of the touch system in the active mode and hence, turn off the illuminated bezels. When the active pointer is returned to the receptacle, the touch system reverts back to the passive mode and hence, the illuminated bezels are turned on.

Alternatively, a unique feature or characteristic associated with the active pointer that can be discerned from images captured by the imaging device can be used to condition the touch system to the active mode. For example, the active pointer may be designed to have a unique profile or to carry an identifying glyph.

If desired, the waveguide may be placed a distance behind the touch surface, such as behind a monitor over which the touch surface is disposed. In this case, the turning prism assembly makes use of prisms that are capable of redirecting light over these distances, such as for example inverted dove prisms.

Although the touch panel assemblies are described as overlying a display screen on which an image is presented, those of skill in the art will appreciate that the touch panel assemblies may be used in a whiteboard environment where a projector is used to project an image on the touch surface.

The above-described embodiments are intended to be examples of the present invention and alterations and modifications may be made thereto, without departing from the spirit and scope thereof as defined by the appended claims.

What is claimed is:

1. An apparatus for detecting a pointer comprising:
    a waveguide defining a touch surface and being formed of material that fluoresces in response to a beam of radiation output by a pointer that is directed into said waveguide via said touch surface resulting in a region of illumination being produced internally in said waveguide;
    a first reflective surface extending along a first side of said waveguide; and
    at least one imaging device looking internally into said waveguide and capturing images including said region of illumination and reflections of said region of illumination appearing in said first reflective surface.

2. An apparatus according to claim 1 further comprising a processing device to process images captured by said imaging device to determine the location of said pointer relative to said touch surface.

3. An apparatus according to claim 2 wherein said waveguide fluoresces in response to a beam of radiation in the ultraviolet range.

4. An apparatus according to claim 3 further comprising a lens through which said imaging device looks internally into said waveguide.

5. An apparatus according to claim 4 wherein said lens is constituted by a shaped portion of said waveguide.

6. An apparatus according to claim 5 wherein said shaped portion is a smoothly curved cutout provided in said waveguide, said imaging device being accommodated by said cutout, said cutout including a highly polished surface through which said imaging device looks.

7. An apparatus according to claim 2 wherein said imaging device is positioned at one corner of said waveguide.

8. An apparatus according to claim 7 further comprising a lens through which said imaging device looks into said waveguide.

9. An apparatus according to claim 8 wherein said lens is constituted by a shaped portion of said waveguide.

10. An apparatus according to claim 9 wherein said shaped portion is a smoothly curved cutout provided in said waveguide, said imaging device being accommodated by said cutout, said cutout including a highly polished surface through which said imaging device looks.

11. An apparatus according to claim 7 wherein said waveguide fluoresces in response to a beam of radiation in the ultraviolet range.

12. An apparatus according to claim 2 further comprising a second reflective surface extending along a second side of said waveguide, said first and second sides joining at a first corner, said imaging device capturing images including said region of illumination and reflections of said region of illumination appearing in said first and second reflective surfaces.

13. An apparatus according to claim 12 wherein said waveguide fluoresces in response to a beam of radiation in the ultraviolet range.

14. An apparatus according to claim 13 further comprising a lens through which said imaging device looks into said waveguide.

15. An apparatus according to claim 14 wherein said lens is constituted by a shaped portion of said waveguide.

16. An apparatus according to claim 15 wherein said shaped portion is a smoothly curved cutout provided in said waveguide, said imaging device being accommodated by said cutout, said cutout including a highly polished surface through which said imaging device looks.

17. An apparatus according to claim 12 wherein said imaging device is positioned at a second corner of said waveguide, said second corner being diagonally opposite said first corner.

18. An apparatus according to claim 17 wherein said waveguide fluoresces in response to a beam of radiation in the ultraviolet range.

19. An apparatus according to claim 17 further comprising a non-reflective region generally in the plane of at least one of said first and second reflective surfaces adjacent said first corner.

20. An apparatus according to claim 19 wherein said non-reflective region extends in the planes of both of said first and second reflective surfaces.

21. An apparatus according to claim 19 wherein said non-reflective region extends only in the plane of one of said first and second reflective surfaces.

22. An apparatus according to claim 19 wherein said waveguide fluoresces in response to a beam of radiation in the ultraviolet range.

23. An apparatus according to claim 2 further comprising said pointer, said pointer comprising a power source and a signal source and being operative to emit said beam of radiation upon contact with said touch surface.

24. An apparatus according to claim 23 wherein said pointer generates a beam of radiation in the ultraviolet range.

25. An apparatus according to claim 24 wherein said generated beam of radiation is pulsed.

26. An apparatus according to claim 25 wherein the signal source of said pointer comprises an ultraviolet light source that is pulsed when said pointer is in contact with said touch surface, a light pipe to direct light generated by said light source to a tip of said pointer, and a dispersion element adjacent said tip to disperse ultraviolet light exiting said pointer.

27. A tablet for a touch system comprising:
a waveguide defining a touch surface and being formed of material that fluoresces to produce a region of illumination therein in response to a beam of radiation directed into said waveguide via said input surface;
a first reflective surface extending along a first side of said waveguide; and
at least one lens through which an imaging device looks into said waveguide, wherein said at least one lens is defined by at least one shaped portion of said waveguide, said shaped portion being a smoothly curved cutout provided in said waveguide, said cutout including a highly polished surface.

28. A tablet according to claim 27 wherein said waveguide fluoresces in response to a beam of radiation in the ultraviolet range.

29. A tablet according to claim 27 wherein said waveguide fluoresces in the ultraviolet range.

30. A tablet according to claim 27 further comprising a second reflective surface extending along a second side of said waveguide, said first and second sides joining at a first corner opposite said lens.

31. A tablet according to claim 30 further including a non-reflective region generally in the plane of at least one of said first and second reflective surfaces adjacent said first corner.

32. A tablet according to claim 31 wherein said non-reflective region extends in the planes of both of said first and second reflective surfaces.

33. A tablet according to claim 31 wherein said non-reflective region extends only in the plane of one of said first and second reflective surfaces.

34. A tablet according to claim 30 wherein said waveguide fluoresces in response to a beam of radiation in the ultraviolet range.

* * * * *